(12) United States Patent
Hosotani

(10) Patent No.: US 11,509,168 B2
(45) Date of Patent: Nov. 22, 2022

(54) WIRELESS POWER SUPPLY SYSTEM AND POWER TRANSMISSION DEVICE THEREOF

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 61 days.

(21) Appl. No.: 16/125,260

(22) Filed: Sep. 7, 2018

(65) Prior Publication Data

US 2019/0006887 A1 Jan. 3, 2019

Related U.S. Application Data

(63) Continuation of application No. PCT/JP2017/007605, filed on Feb. 28, 2017.

(30) Foreign Application Priority Data

Mar. 18, 2016 (JP) .............................. JP2016-056203

(51) Int. Cl.
*H02J 50/12* (2016.01)
*H02J 50/50* (2016.01)

(52) U.S. Cl.
CPC .............. *H02J 50/12* (2016.02); *H02J 50/50* (2016.02)

(58) Field of Classification Search
CPC .. H02J 50/10; H02J 50/12; H02J 50/40; H02J 50/50; H02J 50/80; H02J 50/90;
(Continued)

(56) References Cited

U.S. PATENT DOCUMENTS 9,283,894 B2 * 3/2016 Shimokawa ............ H02J 50/12
10,186,372 B2 * 1/2019 John ....................... H02J 5/005
(Continued)

FOREIGN PATENT DOCUMENTS

CN 103959598 A 7/2014
JP 2010-263690 A 11/2010
(Continued)

OTHER PUBLICATIONS

International Search Report issued in PCT/JP2017/007605; dated Apr. 25, 2017.
(Continued)

*Primary Examiner* — Rexford N Barnie
*Assistant Examiner* — Thai H Tran
(74) *Attorney, Agent, or Firm* — Studebaker & Brackett PC

(57) ABSTRACT

Provided is a wireless power supply system employing a magnetic resonance technique in which high-frequency power is wirelessly supplied from a power transmission device that includes a power transmission coil to a power reception device that includes a power reception coil that is at least magnetically coupled with the power transmission coil. The wireless power supply system includes a relay coil that is coupled with the power transmission coil and the power reception coil using at least a magnetic field, and a relay circuit that is connected to the relay coil and forms a resonant circuit together with the relay coil. When k1 represents a coupling coefficient between the power transmission coil and the power reception coil and k2 represents a coupling coefficient between the power transmission coil and the relay coil, a relationship k1≥k2 holds true.

23 Claims, 14 Drawing Sheets

(58) Field of Classification Search
CPC ... H02J 5/005; H02J 7/025; H02J 7/02; H01F 38/14; H04B 5/00; H04B 5/0012; H04B 5/0037; B60L 1/00
USPC ..... 307/104, 149, 9.1, 10.1, 10.2, 66, 80, 43
See application file for complete search history.

(56) References Cited

U.S. PATENT DOCUMENTS

| | | | |
|---|---|---|---|
| 10,317,963 B1* | 6/2019 | DeVaul | G06F 1/26 |
| 2009/0153273 A1* | 6/2009 | Chen | H02J 50/50 |
| | | | 333/219 |
| 2010/0052431 A1* | 3/2010 | Mita | H01Q 1/248 |
| | | | 307/104 |
| 2010/0065352 A1* | 3/2010 | Ichikawa | H01F 27/26 |
| | | | 180/65.8 |
| 2011/0175455 A1* | 7/2011 | Hashiguchi | H02J 50/90 |
| | | | 307/104 |
| 2012/0001497 A1* | 1/2012 | Sada | H02J 50/50 |
| | | | 307/104 |
| 2012/0286584 A1* | 11/2012 | Park | H02J 5/005 |
| | | | 307/104 |
| 2013/0015699 A1* | 1/2013 | Mita | B60L 53/122 |
| | | | 307/9.1 |
| 2014/0035390 A1* | 2/2014 | Bae | H01F 38/14 |
| | | | 307/104 |
| 2014/0252875 A1* | 9/2014 | Lee | H02J 50/90 |
| | | | 307/104 |
| 2014/0292100 A1* | 10/2014 | Lee | H02J 50/12 |
| | | | 307/104 |
| 2014/0354220 A1* | 12/2014 | Liu | H02J 50/50 |
| | | | 320/108 |
| 2015/0380988 A1* | 12/2015 | Chappell | H01F 38/14 |
| | | | 307/104 |
| 2017/0054329 A1* | 2/2017 | You | H02J 50/12 |
| 2017/0054330 A1* | 2/2017 | You | H02J 50/12 |
| 2017/0141582 A1* | 5/2017 | Adolf | H02J 50/12 |
| 2017/0141583 A1* | 5/2017 | Adolf | H02J 50/80 |
| 2017/0141584 A1* | 5/2017 | DeVaul | H04W 76/14 |
| 2017/0240055 A1* | 8/2017 | Nguyen | H02J 50/12 |
| 2018/0159382 A1* | 6/2018 | Lin | H02J 50/50 |

FOREIGN PATENT DOCUMENTS

| | | | |
|---|---|---|---|
| JP | 2012-222961 A | 11/2012 | |
| JP | 2012-239308 A | 12/2012 | |
| JP | 2013-027132 A | 2/2013 | |
| JP | 2014-143836 A | 8/2014 | |
| JP | 2014-217117 A | 11/2014 | |
| JP | 2017130996 A * | 7/2017 | ............ H01F 38/14 |

OTHER PUBLICATIONS

Written Opinion issued in PCT/JP2017/007605; dated Apr. 25, 2017.

An Office Action issued by the China National Intellectual Property Administration dated Jan. 15, 2021, which corresponds to Chinese Patent Application No. 201780007178.0 and is related to U.S. Appl. No. 16/125,260 with English language translation.

* cited by examiner

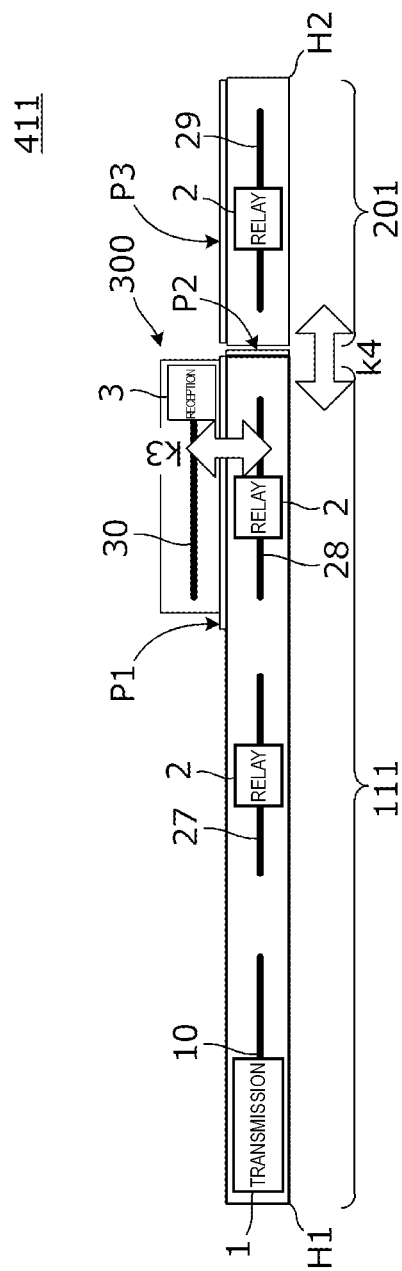

WIRELESS POWER SUPPLY SYSTEM AND POWER TRANSMISSION DEVICE THEREOF

CROSS-REFERENCE TO RELATED APPLICATIONS

This application claims benefit of priority to International Patent Application No. PCT/JP2017/007605, filed Feb. 28, 2017, and to Japanese Patent Application No. 2016-056203, filed Mar. 18, 2016, the entire contents of each are incorporated herein by reference.

BACKGROUND

Technical Field

The present disclosure relates to a wireless power supply system in which high-frequency power is supplied from a power transmission device to a power reception device and relates to a power transmission device of the wireless power supply system.

Background Art

In magnetic-coupling-type wireless power supply systems, such as systems using an electromagnetic induction method, a magnetic resonance method, and a direct-current resonance method, power transmission is performed through coupling between a power transmission coil of a power transmission device and a power reception coil of a power reception device using a magnetic field. For example, Japanese Unexamined Patent Application Publication No. 2013-27132 discloses a system that includes a plurality of power transmission units (power transmission coil+power transmission driving circuit etc.) such that power can be received by a power reception device regardless of where the power reception device is positioned on a power transmission device.

SUMMARY

The power transmission device and the power reception device are configured such that a power transmission coil of the power transmission device and a power reception coil of the power reception device magnetically couple with each other when the power transmission device and the power reception device are arranged in a prescribed positional relationship with respect to each other.

However, the power transmission device disclosed in Japanese Unexamined Patent Application Publication No. 2013-27132 includes a plurality of power transmission units that are electrically connected to a power supply circuit. In the case of this configuration, a plurality of power transmission driving circuits and complex wiring are necessary and the system becomes complex. Increasing the surface area of the power transmission surface of the power transmission device leads to the system being equipped with a plurality of power transmission driving circuits and complex wiring, the system being increased in size and a significant increase in cost.

Accordingly, the present disclosure provides a wireless power supply system and a power transmission device thereof with which power can be wirelessly supplied over a wide range, across a wide area, with little power loss, and with high power efficiency. The wireless power supply system and power transmission device thus can wirelessly supply power without providing a large number of power transmission units that are individually equipped with circuits which results in an increase in cost such as power transmission driving circuits, but instead by using a simple configuration in which as few power transmission devices and power transmission circuits as possible are employed.

In a wireless power supply system of the present disclosure, a magnetic resonance technique is employed and high-frequency power is wirelessly supplied from a power transmission device that includes a power transmission coil to a power reception device that includes a power reception coil that is at least magnetically coupled with the power transmission coil. The wireless power supply system includes a relay coil that is coupled with the power transmission coil and the power reception coil using at least a magnetic field; and a relay circuit that is connected to the relay coil and forms a resonant circuit together with the relay coil. When $k1$ represents a coupling coefficient between the power transmission coil and the power reception coil and $k2$ represents a coupling coefficient between the power transmission coil and the relay coil, a relationship $k1 \geq k2$ holds true. In addition, when $d1$ represents a shortest distance between the power transmission coil and the power reception coil and $d2$ represents a shortest distance between the power transmission coil and the relay coil, a relationship $d1 \leq d2$ holds true.

With the above-described configuration, supplying of power from the power transmission coil to the relay coil is suppressed and the power reception device can efficiently receive power from the power transmission device.

In a wireless power supply system of the present disclosure, a magnetic resonance technique is employed and high-frequency power is wirelessly supplied from a power transmission device that includes a power transmission coil to a power reception device that includes a power reception coil that is at least magnetically coupled with the power transmission coil. The wireless power supply system includes a relay coil that is coupled with the power transmission coil and the power reception coil using at least a magnetic field; and a relay circuit that is connected to the relay coil and forms a resonant circuit together with the relay coil. When $k2$ represents a coupling coefficient between the power transmission coil and the relay coil and $k3$ represents a coupling coefficient between the power reception coil and the relay coil, a relationship $k3 \geq k2$ holds true. In addition, when $d2$ represents a shortest distance between the power transmission coil and the relay coil and $d3$ represents a shortest distance between the power reception coil and the relay coil, a relationship $d3 \leq d2$ holds true.

With the above-described configuration, power can be supplied from the power transmission device to the power reception device with high efficiency and little power loss in the case where the power reception coil is arranged at a distant position in an arrangement with the power transmission coil and the relay coil. In this case, when $k23$ represents the coupling coefficient between the power transmission coil and the power reception coil, the coupling coefficient $k23$ can be expressed with the relationship $k23 = k2 * k3$, and when $k3 = k2$, the value of $k23$ is maximum and the efficiency with which power is supplied from the power transmission device to the power reception device is maximum. However, when loss in the relay coil is taken into consideration, the efficiency with which power is supplied from the power transmission device to the power reception device is actually maximum under a condition of $k3 > k2$ rather than $k3 = k2$. Therefore, as described above, the relationship $k3 \geq k2$ preferably holds true. In the case where the physical shapes, sizes or the like of the coils are similar to each other, if the coupling coefficient relationship is restated as a distance relationship, it is preferable that a relationship d3≤d2 hold true.

In a wireless power supply system of the present disclosure, a magnetic resonance technique is employed and high-frequency power is wirelessly supplied from a power transmission device that includes a power transmission coil to a power reception device that includes a power reception coil that is at least magnetically coupled with the power transmission coil. The wireless power supply system includes a plurality of relay coils; and relay circuits that are respectively connected to the plurality of relay coils and respectively form resonant circuits together with the relay coils. Among the plurality of relay coils, adjacent relay coils are coupled with each other using at least a magnetic field, one relay coil among the plurality of relay coils is coupled with the power transmission coil using at least a magnetic field, and one relay coil among the plurality of relay coils is a coupling relay coil that is coupled with the power reception coil using at least a magnetic field. When k3 represents a coupling coefficient between the coupling relay coil and the power reception coil and k4 represents a coupling coefficient between a relay coil that is downstream of the coupling relay coil, among the plurality of relay coils, and the coupling relay coil, a relationship k3≥k4 holds true. In addition, when d3 represents a shortest distance between the coupling relay coil and the power reception coil and d4 represents a shortest distance between a relay coil that is downstream of the coupling relay coil, among the plurality of relay coils, and the coupling relay coil, a relationship d3≤d4 holds true.

With the above-described configuration, supplying of power from the coupling relay coil to the relay coil downstream of the coupling relay coil is suppressed, and the power reception device can efficiently receive power from the coupling relay coil.

In a wireless power supply system of the present disclosure, a magnetic resonance technique is employed and high-frequency power is wirelessly supplied from a power transmission device that includes a power transmission coil to a power reception device that includes a power reception coil that is at least magnetically coupled with the power transmission coil. The wireless power supply system includes a plurality of relay coils; and relay circuits that are respectively connected to the plurality of relay coils and respectively form resonant circuits together with the relay coils. Among the plurality of relay coils, adjacent relay coils are coupled with each other using at least a magnetic field, one relay coil among the plurality of relay coils is coupled with the power transmission coil using at least a magnetic field, and one relay coil among the plurality of relay coils is a coupling relay coil that is coupled with the power reception coil using at least a magnetic field. When k4 represents a coupling coefficient between a relay coil that is upstream of the coupling relay coil, among the plurality of relay coils, and the coupling relay coil and k5 represents a coupling coefficient between the coupling relay coil and the power reception coil, a relationship k5≥k4 holds true. In addition, when d4 represents a shortest distance between the relay coil that is upstream of the coupling relay coil, among the plurality of relay coils, and the coupling relay coil and d5 represents a shortest distance between the coupling relay coil and the power reception coil, a relationship d5≤d4 holds true.

With this configuration, power can be transferred from the power transmission device to the power reception device even in the case where there are a plurality of relay coils between the power transmission coil and the power reception coil. In this case, when k45 represents the coupling coefficient between the coupling relay coil and the power reception coil, the coupling coefficient k45 can be expressed with the relationship k45=k4*k5, and when k5=k4, the value of k45 is maximum and the efficiency with which power is supplied from the coupling relay coil to the power reception device is maximum. However, when loss in the upstream relay coil is taken into consideration, the efficiency with which power is supplied from coupling relay coil to the power reception device is actually maximum under a condition of k5>k4 rather than k5=k4. Therefore, as described above, the relationship k5≥k4 preferably holds true. If this coupling coefficient relationship is restated as a distance relationship, the distance can be expressed as the relationship d5≤d4.

According to the present disclosure, there are provided a wireless power supply system and a power transmission device thereof with which power can be wirelessly supplied over a wide range, across a wide area, with little power loss, and with high power efficiency. The wireless power supply system and power transmission device thus can wirelessly supply power without providing a large number of power transmission units that are individually equipped with circuits which results in an increase in cost such as power transmission driving circuits, but instead by using a simple configuration in which as few power transmission devices and power transmission circuits as possible are employed.

BRIEF DESCRIPTION OF THE DRAWINGS

FIG. 14 is a schematic front view of a wireless power supply system according to an eleventh embodiment.

DETAILED DESCRIPTION

Figure 1:
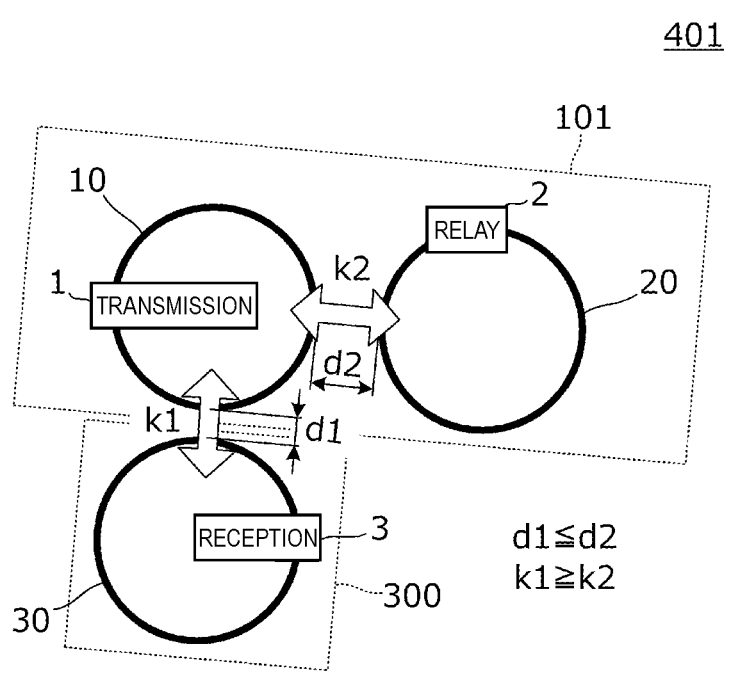
FIG. 1 is a diagram illustrating the configurations of a wireless power supply system and a power transmission device according to a first embodiment.

Hereafter, a plurality of modes for carrying the present disclosure will be described by giving a number of specific examples of the present disclosure while referring to the drawings. Identical parts are denoted by identical symbols in the drawings. Taking explanation of important points or ease of understanding into account, the embodiments are described in a separate manner for the sake of convenience, but parts of the configurations illustrated in the different embodiments may be substituted for one another or combined with each other. In the second embodiment and embodiments thereafter, description of matters common to the first embodiment will be omitted and only the differences will be described. In particular, the same operational effects resulting from the same configurations will not be repeatedly described in the individual embodiments.

First Embodiment

In a first embodiment, a wireless power supply system is described in which a relay coil is present and power is supplied from a power transmission device to a power reception device without passing through the relay coil, and the power transmission device of the wireless power supply system is described.

FIG. 1 is a diagram illustrating the configurations of a wireless power supply system 401 and a power transmission device according to the first embodiment. In the wireless power supply system 401, high-frequency power (hereafter, simply "power") is supplied from a power transmission device 101, which includes a power transmission coil 10, to a power reception device 300, which includes a power reception coil 30, using at least a magnetic resonance method.

As illustrated in FIG. 1, for example, the wireless power supply system 401 includes the power transmission coil 10, a relay coil 20, and the power reception coil 30, which each have a circular loop shape. The relay coil 20 and the power reception coil 30 are arranged close to the power transmission coil 10. The relay coil 20 is not arranged between the power transmission coil 10 and the power reception coil 30. In this example, the planes of the coil openings of the power transmission coil 10, the relay coil 20, and the power reception coil 30 coincide with each other or are parallel to each other.

A power transmission circuit 1 is connected to the power transmission coil 10 and a power reception circuit 3 is connected to the power reception coil 30. The power transmission coil 10 and the power reception coil 30 are at least magnetically coupled with each other. The power transmission coil 10 and the relay coil 20 are also at least magnetically coupled to each other. Another power reception coil other than the power reception coil 30 or another relay coil may be coupled to the relay coil 20, but illustration of such a coil is omitted from FIG. 1.

Figure 2:
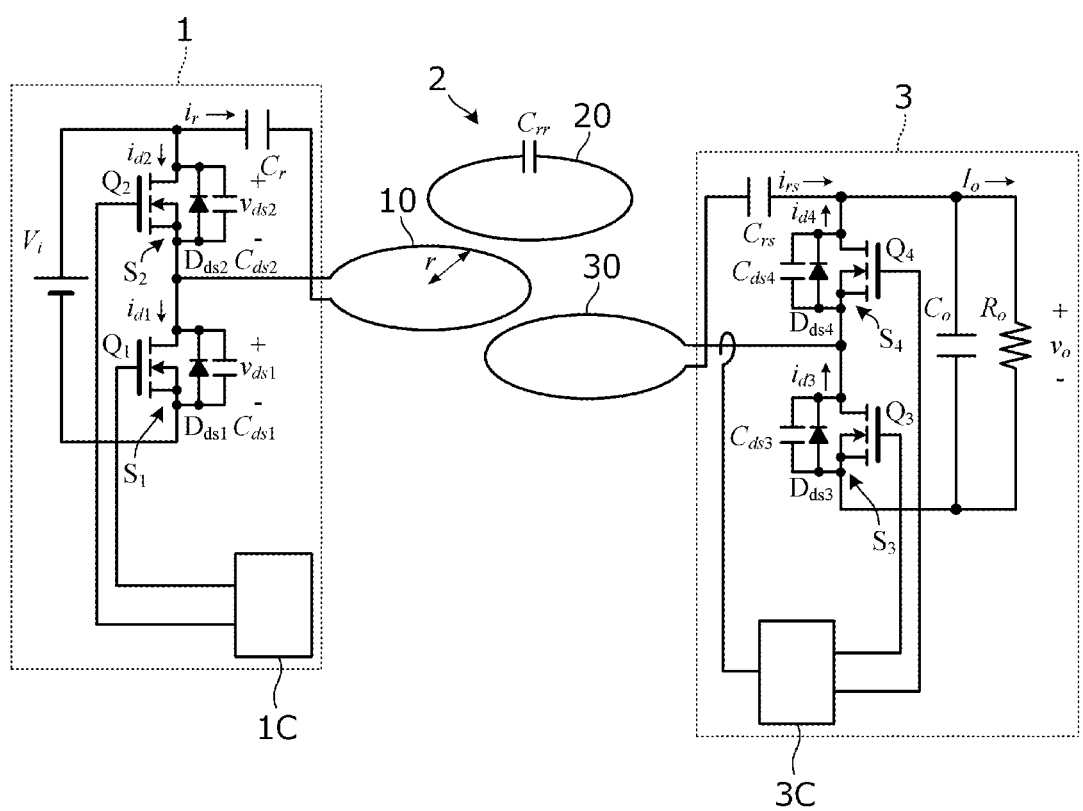
FIG. 2 is a circuit diagram of the wireless power supply system of the first embodiment.

FIG. 2 is a circuit diagram of the wireless power supply system 401 of the first embodiment. The wireless power supply system 401 is equipped with an input power supply Vi in an input section of the power transmission circuit 1, and stable direct-current energy is wirelessly supplied to a load Ro of the power reception circuit 3.

The power transmission circuit 1 includes the power transmission coil 10, a resonant capacitor Cr, and a power-transmission-side switching circuit that includes switch elements Q1 and Q2 and a switching control circuit 1C that controls the switch elements Q1 and Q2. The power transmission coil 10 and the resonant capacitor Cr form a "power-transmission-side resonant circuit".

A switch circuit S1 is formed by a circuit in which the switch element Q1, a reverse parallel diode Dds1, and a parasitic capacitor Cds1 are connected in parallel with each other. Similarly, a switch circuit S2 is formed by a circuit in which the switch element Q2, a reverse parallel diode Dds2, and a parasitic capacitor Cds2 are connected in parallel with each other. Hereafter, a reverse parallel diode (parasitic diode) will be simply referred to as "diode".

The switching control circuit 1C is connected to the power-transmission-side resonant circuit and intermittently applies a direct-current power supply to the power-transmission-side resonant circuit and causes a resonant current to be generated in the power-transmission-side resonant circuit by alternately switching the switch circuits S1 and S2 on and off at a prescribed switching frequency. In this example, the power-transmission-side switching circuit forms a half bridge circuit that includes the two switch circuits S1 and S2.

A relay circuit 2 is formed by the relay coil 20 and a resonant capacitor Crr. The power reception circuit 3 includes the power reception coil 30, a resonant capacitor Crs, a power-reception-side switching circuit that includes switch elements Q3 and Q4 and a switching control circuit 3C that controls the switch elements Q3 and Q4, and a smoothing capacitor Co. A "power-reception-side resonant circuit" is formed by the power reception coil 30 and the resonant capacitor Crs, which is equivalently connected in series with the power reception coil 30.

A switch circuit S3 is formed by a circuit in which the switch element Q3, a diode Dds3, and a capacitor Cds3 are connected in parallel with each other. Similarly, a switch circuit S4 is formed by a circuit in which the switch element Q4, a diode Dds4, and a capacitor Cds4 are connected in parallel with each other.

The switching control circuit 3C detects a current flowing through the power reception coil 30 and alternately switches the switch elements Q3 and Q4 on and off in synchronization with inversion of the polarity of the detected current. Thus, a resonant current flowing through the power-reception-side resonant circuit is rectified in synchronization with changes in the direction in which the current flows, and a current is thus supplied to the load. A power-reception-side rectification circuit is formed by the switch circuits S3 and S4 and the switching control circuit 3C. The smoothing capacitor Co smooths a voltage rectified by the power-reception-side rectification circuit.

The switching control circuit 1C on the power transmission side operates by using the input power supply Vi as a power supply. The switching control circuit 3C on the power reception side operates by using a voltage generated in the power-reception-side resonant circuit, a voltage output to the load, or a specially provided power supply as a power supply.

For example, the resonant frequency of the power-transmission-side resonant circuit is set to be equal to or in the vicinity of the switching frequency of the switching control circuit 1C. In addition, the resonant frequency of the power-transmission-side resonant circuit, the resonant frequency of the relay circuit 2, and the resonant frequency of the power-reception-side resonant circuit are set to be equal to each other or in the vicinity of each other. The power-transmission-side resonant circuit, the relay circuit 2, and the power-reception-side resonant circuit are coupled with each other and as a result composite resonance is generated, and therefore the composite resonant frequency may differ from the switching frequency. On the other hand, the system is simplified and made to operate with high efficiency by making the frequency of an alternating magnetic field used to wirelessly supply power (the operation frequency of the system) match the switching frequency and making the resonant frequency of the relay circuit 2 as a standalone unit basically match the operation frequency of the system.

A resonant circuit is formed by the relay coil 20 and the resonant capacitor Crr. The power transmission coil 10 and the relay coil 20 are electromagnetic resonance coupled with each other and the relay coil 20 and the power transmission coil 10 are electromagnetic resonance coupled with each other. The maximum distance over which power can be transmitted between the power transmission circuit 1 and the power reception circuit 3 is increased by arranging the relay coil 20 between the power transmission coil 10 and the power reception coil 30 in this way. The power transmission coil 10, the relay coil 20, and the power reception coil 30 may be each equivalently represented as a circuit consisting of an ideal transformer, a mutual inductance, and a leakage inductance.

Power is supplied from the power transmission circuit 1 to the power reception circuit 3 as a result of magnetic resonance coupling being generated by a mutual inductance equivalently formed between the power transmission coil 10 and the relay coil 20 and magnetic resonance coupling being generated by a mutual inductance equivalently formed between the relay coil 20 and the power reception coil 30. Energy that is reflected without being transmitted as power from the power transmission circuit 1 (reactive power) is stored as resonant energy in the power-transmission-side resonant circuit. In addition, energy that is reflected without being supplied to the output out of energy received as power by the power reception circuit 3 (reactive power) is also stored as resonant energy in the power-reception-side resonant circuit.

In the case where the power transmission circuit 1, for example, wirelessly supplies power of 6-14 MHz and 0.1-80 W over a distance of 2-50 mm, the radius of the power transmission coil 10 is on the order of 25-75 mm and the wire diameter of the conductor wire of the power transmission coil 10 is on the order of 1-2 mm, for example. The power transmission coil 10, the relay coil 20, and the power reception coil 30 can be formed by forming metal wires into loop shapes or by forming loop-shaped conductor patterns on or in a circuit board.

As illustrated in FIG. 1, when d1 represents the shortest distance between the power transmission coil 10 and the power reception coil 30 and d2 represents the shortest distance between the power transmission coil 10 and the relay coil 20, the relationship d1≤d2 holds true. Furthermore, when k1 represents the coupling coefficient between the power transmission coil 10 and the power reception coil 30 and k2 represents the coupling coefficient between the power transmission coil 10 and the relay coil 20, the relationship k1≥k2 holds true.

With the above-described configuration, supplying of power from the power transmission coil 10 to the relay coil 20 is suppressed and the power reception device 300 can efficiently receive power from the power transmission device 101.

Figure 3:
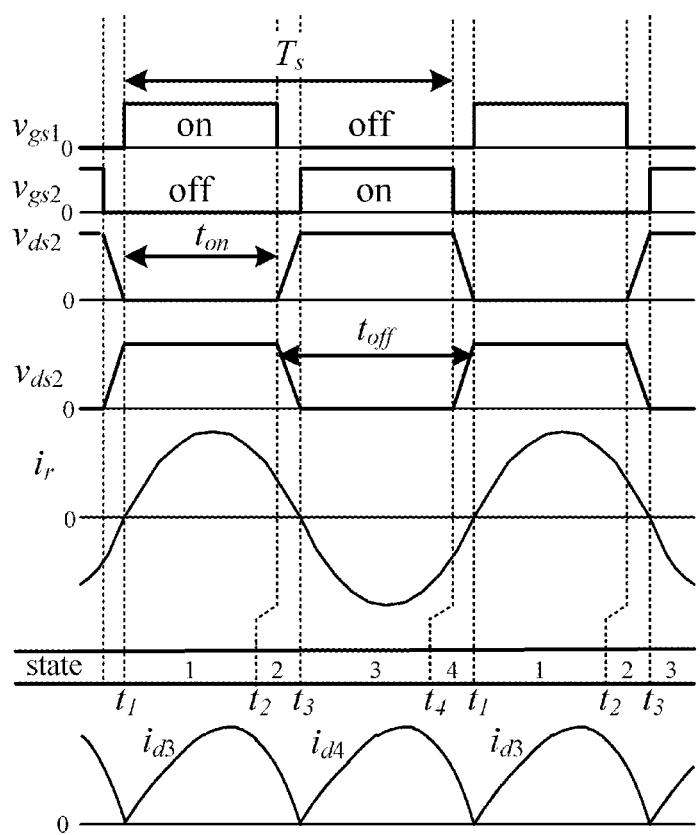
FIG. 3 is a waveform diagram for each part in FIG. 2.

Next, operation of the wireless power supply system 401 illustrated in FIG. 2 will be described in detail while referring to FIG. 3. FIG. 3 is a waveform diagram for each part in FIG. 2.

Lm represents a mutual inductance of the power transmission coil 10, Lr represents a leakage inductance of the power transmission coil 10, Lms represents a mutual inductance of the power reception coil 30, and Lrs represents a leakage inductance of the power reception coil 30. In addition, vgs1 and vgs2 respectively represent the gate-source voltages of the switch elements Q1 and Q2 and vds1 and vds2 respectively represent the drain-source voltages of the switch elements Q1 and Q2.

A ZVS operation is performed by switching the switch elements Q1 and Q2 on and off in an alternating manner either side of a short deadtime in which both switch elements are switched off and inverting the currents that flow through Q1 and Q2 in the deadtime periods. The operation in each state in one switching period will be described next.

(1) State 1 Time t1-t2

To begin with, the diode Dds1 is in a conductive state. A ZVS operation is performed by turning the switch element Q1 on in the conduction period of the diode Dds1 and the switch element Q1 enters a conductive state. Equivalent mutual inductances Lm and Lms are formed by mutual induction between the power transmission coil 10 and the power reception coil 30, and in a composite resonance circuit composed of Cr, Lr, Lm, Lms, Crs, and Lrs, the power transmission resonant circuit and the power reception resonant circuit resonate with each other, resonant currents flow through the mutual inductances Lm and Lms, electromagnetic resonance coupling is formed, and power is supplied from the power transmission circuit to the power reception circuit. On the power transmission side, a resonant current flows through the capacitor Cr and the leakage inductance Lr. On the power reception side, a resonant current flows through the capacitor Crs and the leakage inductance Lrs and is rectified by the switch elements Q3 and Q4, and power is thus supplied to the load. When the switch element Q1 turns off, the system enters state 2.

(2) State 2 Time t2-t3

On the power transmission circuit 1 side, the parasitic capacitor Cds1 is charged and the parasitic capacitor Cds2 is discharged by a current it that flows through the leakage inductance Lr. Once the voltage vds1 becomes equal to the voltage of the input power supply Vi and the voltage vds2 becomes 0 V, the diode Dds2 becomes conductive and the system enters state 3.

(3) State 3 Time t3-t4

To begin with, the diode Dds2 is in a conductive state. A ZVS operation is performed by turning the switch element Q2 on in the conduction period of the diode Dds2 and the switch element Q2 enters a conductive state. Equivalent mutual inductances Lm and Lms are formed by mutual induction between the power transmission coil 10 and the power reception coil 30, and in a composite resonance circuit composed of Cr, Lr, Lm, Lms, Crs, and Lrs, the power transmission resonant circuit and the power reception resonant circuit resonate with each other, resonant currents flow through the mutual inductances Lm and Lms, electromagnetic resonance coupling is formed, and power is supplied from the power transmission circuit to the power reception circuit. On the power transmission side, a resonant current flows through the capacitor Cr and the leakage inductance Lr. On the power reception side, a resonant current flows through the capacitor Crs and the leakage inductance Lrs and is rectified by the switch elements Q3 and Q4, and power is thus supplied to the load. When the switch element Q2 turns off, the system enters state 4.

(4) State 4 Time t4-t1

On the power transmission circuit 1 side, the parasitic capacitor Cds1 is discharged and the parasitic capacitor Cds2 is charged by a current it that flows through the leakage inductance Lr. Once the voltage vds1 becomes 0 V and the voltage vds2 becomes equal to the voltage of the input power supply Vi, the diode Dds1 becomes conductive and the system re-enters state 1.

Thereafter, states 1 to 4 are repeated periodically.

Second Embodiment

In a second embodiment, a wireless power supply system is described in which power is supplied from a power transmission device to a power reception device along the path: power transmission device→relay coil→power reception device, and the power transmission device of the wireless power supply system is described.

Figure 4:
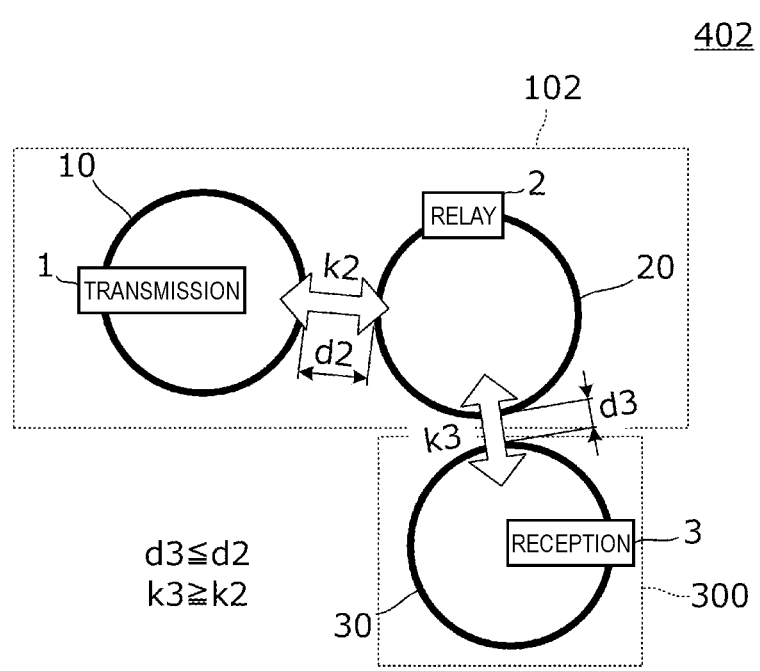
FIG. 4 is a diagram illustrating the configurations of a wireless power supply system and a power transmission device according to a second embodiment.

FIG. 4 is a diagram illustrating the configurations of a wireless power supply system 402 and a power transmission device according to the second embodiment. In the wireless power supply system 402, power is supplied from a power transmission device 102, which includes a power transmission coil 10, to a power reception device 300, which includes a power reception coil 30, using at least a magnetic resonance method.

As illustrated in FIG. 4, the wireless power supply system 402 includes the power transmission coil 10, a relay coil 20, and the power reception coil 30, which each have a circular loop shape. The relay coil 20 is arranged close to the power transmission coil 10 and the power reception coil 30. The relay coil 20 is arranged between the power transmission coil 10 and the power reception coil 30. In this example, the planes of the coil openings of the power transmission coil 10, the relay coil 20, and the power reception coil 30 coincide with each other or are parallel to each other.

A power transmission circuit 1 is connected to the power transmission coil 10 and a power reception circuit 3 is connected to the power reception coil 30. The power transmission coil 10 and the relay coil 20 are at least magnetically coupled with each other and the relay coil 20 and the power reception coil 30 are at least magnetically coupled with each other. Another power reception coil other than the power reception coil 30 or another relay coil may be coupled to the relay coil 20, but illustration of such a coil is omitted from FIG. 4.

Figure 5:
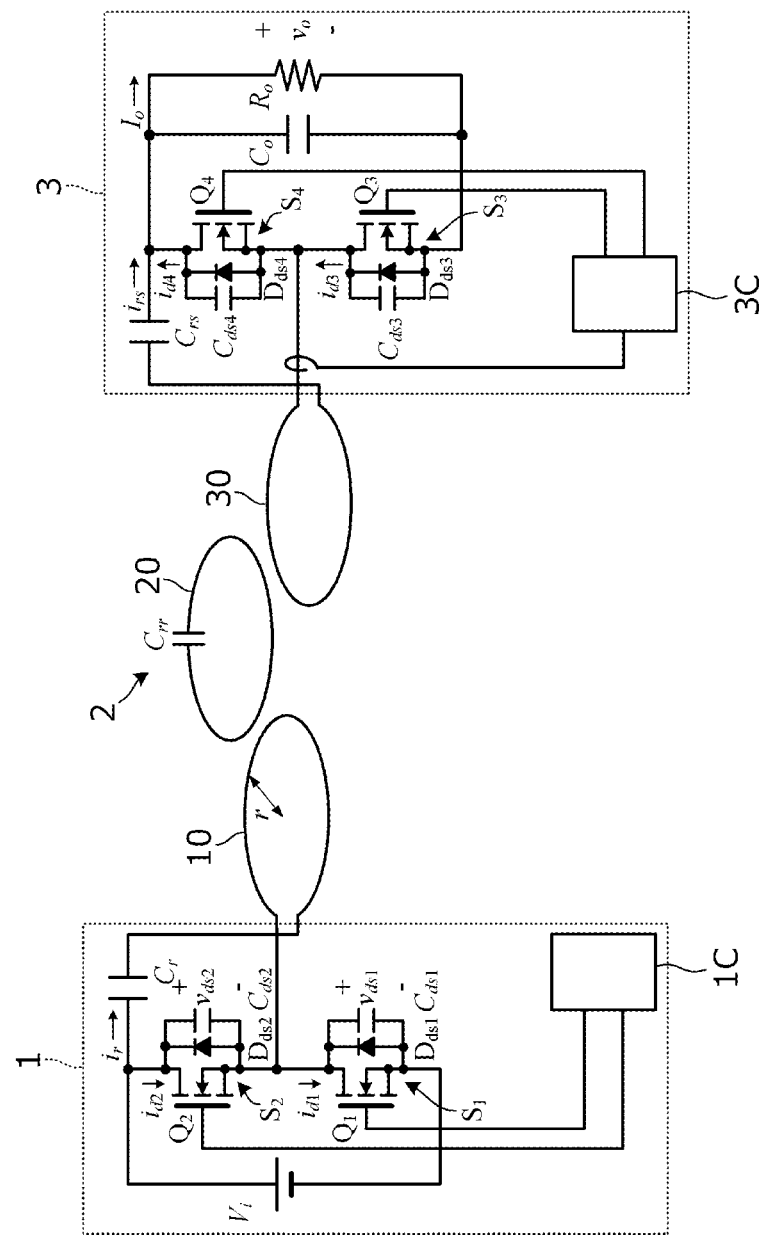
FIG. 5 is a circuit diagram of the wireless power supply system of the second embodiment.

FIG. 5 is a circuit diagram of the wireless power supply system 402 of the second embodiment. The configurations of the power transmission circuit 1, the relay circuit 2, and the power reception circuit 3 are the same as those described in the first embodiment.

As illustrated in FIG. 4, when d2 represents the shortest distance between the power transmission coil 10 and the relay coil 20 and d3 represents the shortest distance between the relay coil 20 and the power reception coil 30, the relationship d3≤d2 holds true. Furthermore, when k2 represents the coupling coefficient between the power transmission coil 10 and the relay coil 20 and k3 represents the coupling coefficient between the relay coil 20 and the power reception coil 30, the relationship k3≥k2 holds true.

Here, when k23 represents the coupling coefficient between the power transmission coil 10 and the power reception coil 30, the coupling coefficient k23 can be expressed with the relationship k23=k2*k3, and when k3=k2, the value of k23 is maximum and the efficiency with which power is supplied from the power transmission device 102 to the power reception device 300 is maximum. However, when loss in the relay coil is taken into consideration, the efficiency with which power is supplied from the power transmission device 101 to the power reception device 300 is maximum under a condition of k3>k2 rather than k3=k2. Therefore, as described above, the relationship k3≥k2 preferably holds true. If this coupling coefficient relationship is restated as a distance relationship, the distance relationship can be expressed as the relationship d3≤d2.

According to this embodiment, in the case where the power reception coil 30 is arranged at a distant position in an arrangement with the power transmission coil 10 and the relay coil 20, in other words, in the case where power is supplied from the power transmission device 102 to the power reception device 300 along the path: power transmission coil 10 relay coil 20 power reception coil 30, power is supplied from the power transmission device 102 to the power reception device 300 with high efficiency.

Third Embodiment

In a third embodiment, a wireless power supply system is described that has a plurality of relay coils and in which a power reception coil is coupled with a relay coil that is close to the power transmission coil, and a power transmission device of the wireless power supply system is described.

Figure 6:
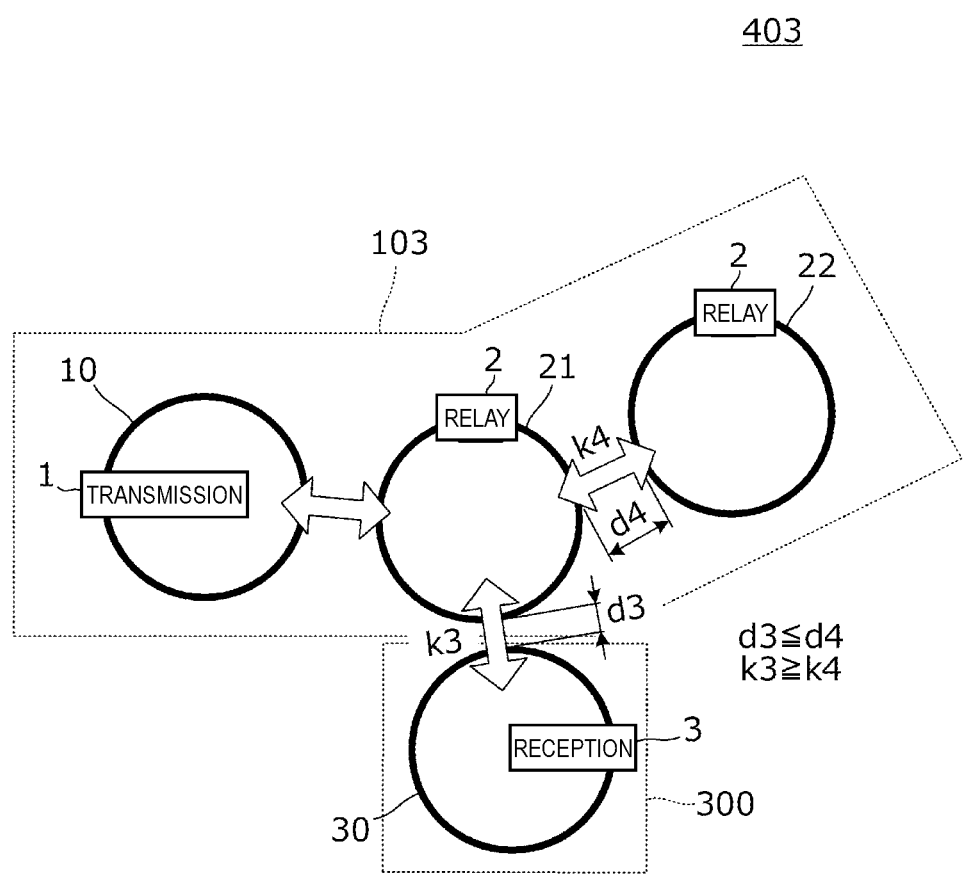
FIG. 6 is a diagram illustrating the configurations of a wireless power supply system and a power transmission device according to a third embodiment.

FIG. 6 is a diagram illustrating the configurations of a wireless power supply system 403 and the power transmission device according to the third embodiment. In the wireless power supply system 403, power is supplied from a power transmission device 103, which includes a power transmission coil 10, to a power reception device 300, which includes a power reception coil 30, using at least a magnetic resonance method.

As illustrated in FIG. 6, the wireless power supply system 403 includes the power transmission coil 10, relay coils 21 and 22, and the power reception coil 30, which each have a circular loop shape. The relay coil 21 is arranged close to the power transmission coil 10 and the power reception coil 30. The relay coil 22 is arranged close to the relay coil 21. In this example, the planes of the coil openings of the power transmission coil 10, the relay coils 21 and 22, and the power reception coil 30 coincide with each other or are parallel to each other.

A power transmission circuit 1 is connected to the power transmission coil 10 and a power reception circuit 3 is connected to the power reception coil 30. The power transmission coil 10 and the relay coil 21 are at least magnetically coupled with each other and the relay coil 21 and the power reception coil 30 are at least magnetically coupled with each other. The relay coil 22 is at least magnetically coupled with the relay coil 21. Another power reception coil or another relay coil other than the power reception coil 30 or the relay coil 21 may be coupled to the relay coil 22, but illustration of such a coil is omitted from FIG. 6. The relay coil 21 in this embodiment is an example of a "coupling relay coil" in the present disclosure. In addition, the relay coil 22 is a relay coil that is downstream of the "coupling relay coil".

The configurations of the power transmission circuit 1, the relay circuit 2, and the power reception circuit 3 are the same as those described in the first and second embodiments.

As illustrated in FIG. 6, when d3 represents the shortest distance between the coupling relay coil 21 and the power reception coil 30 and d4 represents the shortest distance between the coupling relay coil 21 and the relay coil 22 downstream of the coupling relay coil 21, the relationship d3≤d4 holds true. Furthermore, when k3 represents the coupling coefficient between the coupling relay coil 21 and the power reception coil 30 and k4 represents the coupling coefficient between the coupling relay coil 21 and the relay coil 22, the relationship k3≥k4 holds true.

With the above-described configuration, supplying of power from the coupling relay coil 21 to the relay coil 22 downstream of the coupling relay coil 21 is suppressed, and the power reception device 300 can efficiently receive power from the coupling relay coil 21.

Fourth Embodiment

In a fourth embodiment, a wireless power supply system in which a power reception device receives power via a plurality of relay coils is described, and a power transmission device of the wireless power supply system is described.

Figure 7:
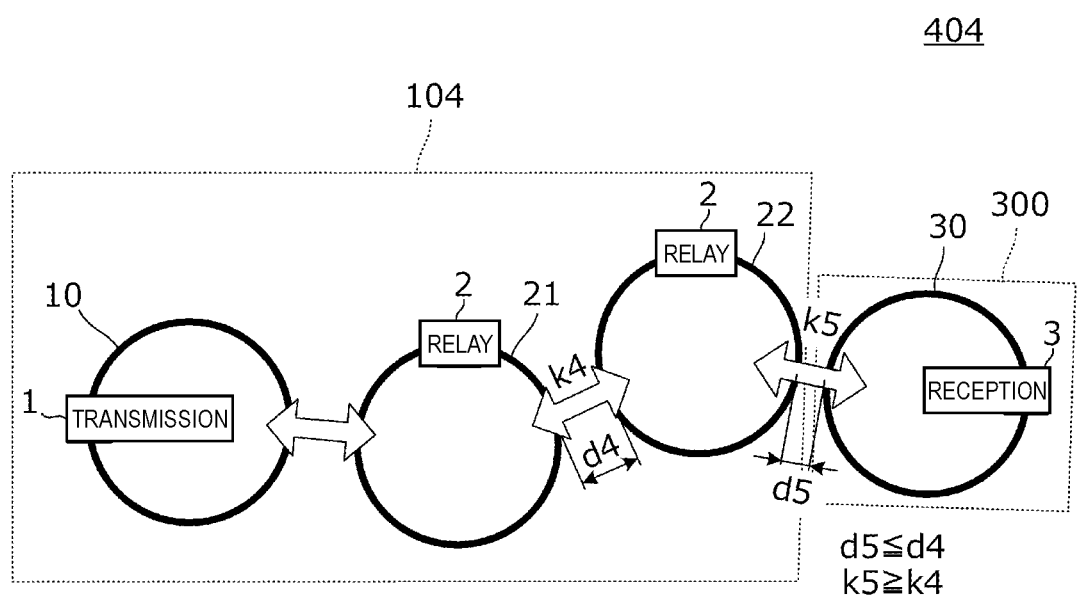
FIG. 7 is a diagram illustrating the configurations of a wireless power supply system and a power transmission device according to a fourth embodiment.

FIG. 7 is a diagram illustrating the configurations of a wireless power supply system 404 and a power transmission device according to the fourth embodiment. In the wireless power supply system 404, power is supplied from a power transmission device 104, which includes a power transmission coil 10 and a plurality of relay coils 21 and 22, to a power reception device 300, which includes a power reception coil 30, using at least a magnetic resonance method.

As illustrated in FIG. 7, the wireless power supply system 404 includes the power transmission coil 10, the relay coils 21 and 22, and the power reception coil 30, which each have a circular loop shape. The relay coil 21 is arranged close to the power transmission coil 10 and the relay coil 22. The power reception coil 30 is arranged close to the relay coil 22. In this example, the planes of the coil openings of the power transmission coil 10, the relay coils 21 and 22, and the power reception coil 30 coincide with each other or are parallel to each other.

A power transmission circuit 1 is connected to the power transmission coil 10 and a power reception circuit 3 is connected to the power reception coil 30. The power transmission coil 10 and the relay coil 21 are at least magnetically coupled with each other and the relay coil 21 and the relay coil 22 are at least magnetically coupled with each other. The relay coil 22 and the power reception coil 30 are at least magnetically coupled with each other. Another power reception coil or another relay coil other than the power reception coil 30 or the relay coils 21 and 22 may be coupled to the relay coil 21 or 22, but illustration of such a coil is omitted from FIG. 7. The relay coil 22 in this embodiment is an example of a "coupling relay coil" in the present disclosure. In addition, the relay coil 21 is a relay coil that is upstream of the "coupling relay coil".

The configurations of the power transmission circuit 1, the relay circuit 2, and the power reception circuit 3 are the same as those described in the first and second embodiments.

As illustrated in FIG. 7, when d4 represents the shortest distance between the coupling relay coil 22 and the upstream relay coil 21 and d5 represents the shortest distance between the coupling relay coil 22 and the power reception coil 30, the relationship d5≤d4 holds true. In addition, when k4 represents the coupling coefficient between the coupling relay coil 22 and the upstream relay coil 21 and k5 represents the coupling coefficient between the coupling relay coil 22 and the power reception coil 30, the relationship k5≥k4 holds true.

In this case, when k45 represents the coupling coefficient between the upstream relay coil 21 and the power reception coil 30, the coupling coefficient k45 can be expressed with the relationship k45=k4*k5, and when k5=k4, the value of k45 is maximum and the efficiency with which power is supplied from the coupling relay coil 22 to the power reception device 300 is maximum. However, when loss in the upstream relay coil is taken into consideration, the efficiency with which power is supplied from coupling relay coil to the power reception device is actually maximum under a condition of k5>k4 rather than k5=k4. Therefore, as described above, the relationship k5≥k4 preferably holds true. If this coupling coefficient relationship is restated as a distance relationship, the distance relationship can be expressed as the relationship d5≤d4.

According to this embodiment, power can be supplied from the power transmission device 104 to the power reception device 300 with high efficiency in the case where a plurality of relay coils 21 and 22 are arranged between the power transmission coil 10 and the power reception coil 30.

Fifth Embodiment

In a fifth embodiment, a wireless power supply system is described in which power is wirelessly supplied from a power transmission device to a power reception device using a plurality of relay coils and in which there is a relay coil downstream of a relay coil (coupling relay coil) that is coupled with a power reception coil among the plurality of relay coils, and a power transmission device of the wireless power supply system is described.

Figure 8:
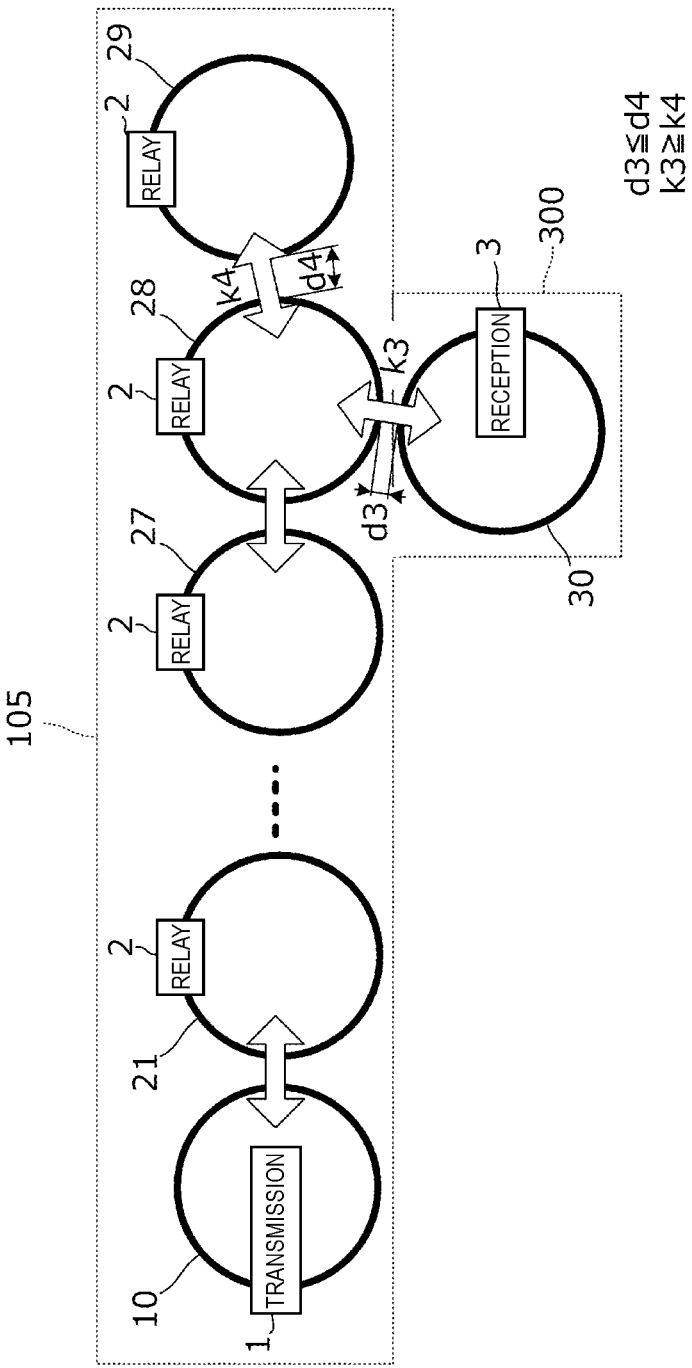
FIG. 8 is a diagram illustrating the configurations of a power transmission device and a wireless power supply system according to a fifth embodiment.

FIG. 8 is a diagram illustrating the configurations of a power transmission device 105 and a wireless power supply system 405 according to the fifth embodiment. In the wireless power supply system 405, power is supplied from the power transmission device 105, which includes a power transmission coil 10, to a power reception device 300, which includes a power reception coil 30 that is at least magnetically coupled thereto via a plurality of relay coils 21, . . . , 27, and 28 using at least a magnetic resonance method.

As illustrated in FIG. 8, the wireless power supply system 405 includes the power transmission coil 10, the relay coils 21 to 29, and the power reception coil 30, which each have a circular loop shape. The power reception coil 30 is arranged close to the relay coil 28. The relay coil 29 is not arranged between the power transmission coil 10 and the power reception coil 30.

The relay coil 28 in this embodiment is an example of a "coupling relay coil" in the present disclosure. In addition, the relay coil 29 is a relay coil that is downstream of the "coupling relay coil".

The configurations of the power transmission circuit 1, the relay circuit 2, and the power reception circuit 3 are the same as those described in the first and second embodiments.

As illustrated in FIG. 8, when d3 represents the shortest distance between the coupling relay coil 28 and the power reception coil 30 and d4 represents the shortest distance between the coupling relay coil 28 and the relay coil 29 downstream of the coupling relay coil 28, the relationship d3≤d4 holds true. Furthermore, when k3 represents the coupling coefficient between the coupling relay coil 28 and the power reception coil 30 and k4 represents the coupling coefficient between the coupling relay coil 28 and the relay coil 29, the relationship k3≥k4 holds true.

With the above-described configuration, supplying of power from the coupling relay coil 28 to the relay coil 29 downstream of the coupling relay coil 28 is suppressed, and the power reception device 300 can efficiently receive power from the coupling relay coil 28.

Sixth Embodiment

In a sixth embodiment, a wireless power supply system is described in which power is wirelessly supplied from a power transmission device to a power reception device using a plurality of relay coils and in which a power reception coil is coupled with a relay coil that is furthermost downstream among the plurality of relay coils, and a power transmission device of the wireless power supply system is described.

Figure 9:
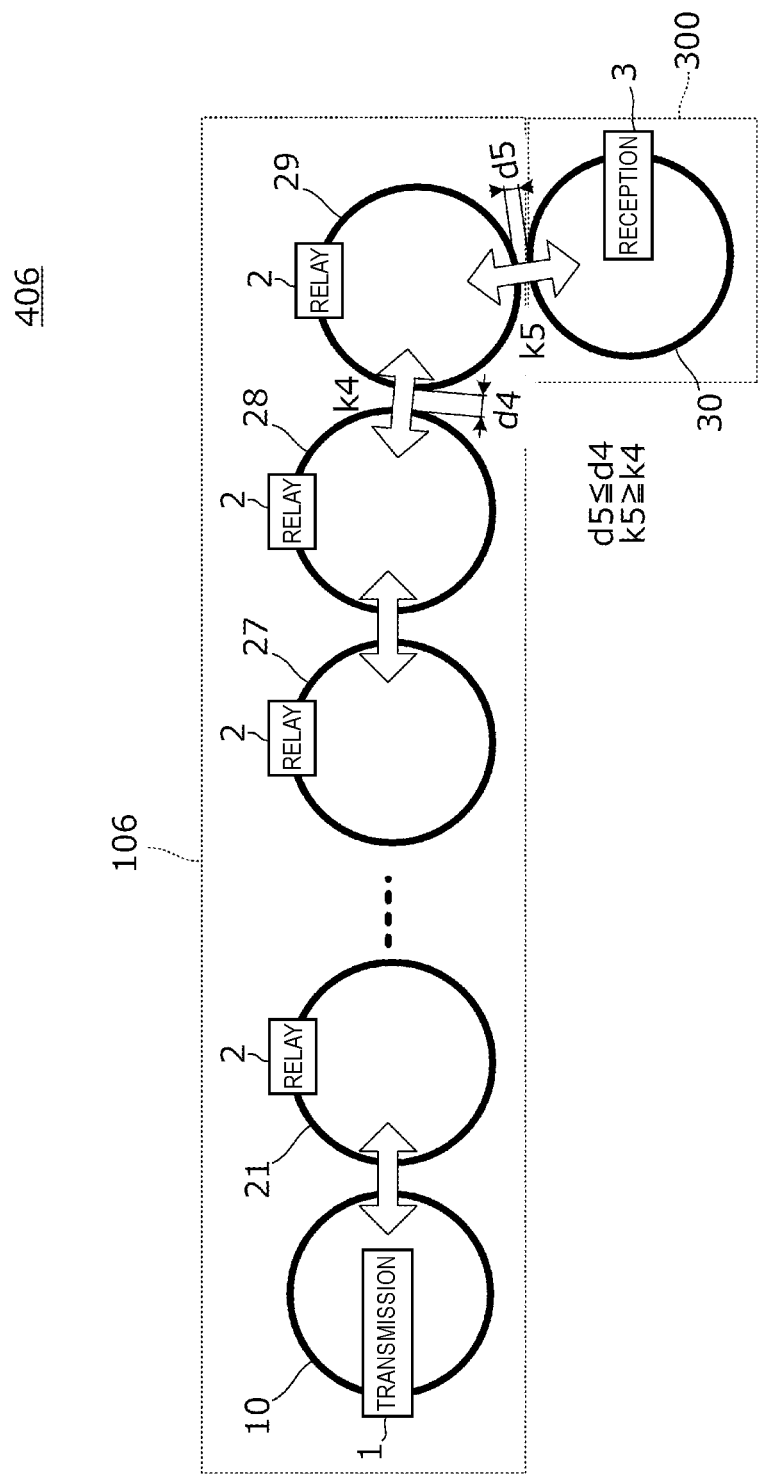
FIG. 9 is a diagram illustrating the configurations of a wireless power supply system and a power transmission device according to a sixth embodiment.

FIG. 9 is a diagram illustrating the configurations of a wireless power supply system 406 and a power transmission device according to the sixth embodiment. In the wireless power supply system 406, power is supplied from a power transmission device 106, which includes a power transmission coil 10 and a plurality of relay coils 21 to 29, to a power reception device 300, which includes a power reception coil 30, using at least a magnetic resonance method.

As illustrated in FIG. 9, the wireless power supply system 406 includes the power transmission coil 10, the relay coils 21 to 29, and the power reception coil 30, which each have a circular loop shape. The power reception coil 30 is arranged close to the relay coil 29.

A power transmission circuit 1 is connected to the power transmission coil 10 and a power reception circuit 3 is connected to the power reception coil 30. The power transmission coil 10 and the relay coil 21 are at least magnetically coupled with each other and adjacent relay coils are also at least magnetically coupled with each other. The relay coil 29 and the power reception coil 30 are at least magnetically coupled with each other. Another power reception coil or another relay coil other than the power reception coil 30 or the relay coils 21 to 29 may be coupled to the relay coil 21 to 29, but illustration of such a coil is omitted from FIG. 9. The relay coil 29 in this embodiment is an example of a "coupling relay coil" in the present disclosure. In addition, the relay coil 28 is a relay coil that is upstream of the "coupling relay coil".

The configurations of the power transmission circuit 1, the relay circuit 2, and the power reception circuit 3 are the same as those described in the first and second embodiments.

As illustrated in FIG. 9, when d4 represents the shortest distance between the coupling relay coil 29 and the upstream relay coil 28 and d5 represents the shortest distance between the coupling relay coil 29 and the power reception coil 30, the relationship d5≤d4 holds true. In addition, when k4 represents the coupling coefficient between the coupling relay coil 29 and the upstream relay coil 28 and k5 represents the coupling coefficient between the coupling relay coil 29 and the power reception coil 30, the relationship k5≥k4 holds true.

Similarly to as in the case described in the fourth embodiment, power can be supplied from the power transmission device 106 to the power reception device 300 with high efficiency in the case where a plurality of relay coils 21 to 29 are arranged between the power transmission coil 10 and the power reception coil 30 by satisfying the relationship k5≥k4 or d5≤d4.

Seventh Embodiment

In a seventh embodiment, a wireless power supply system is described in which a power reception coil is coupled with a plurality of relay coils and power is supplied from a power transmission device to a power reception device, and the power transmission device of the wireless power supply system is described.

Figure 10:
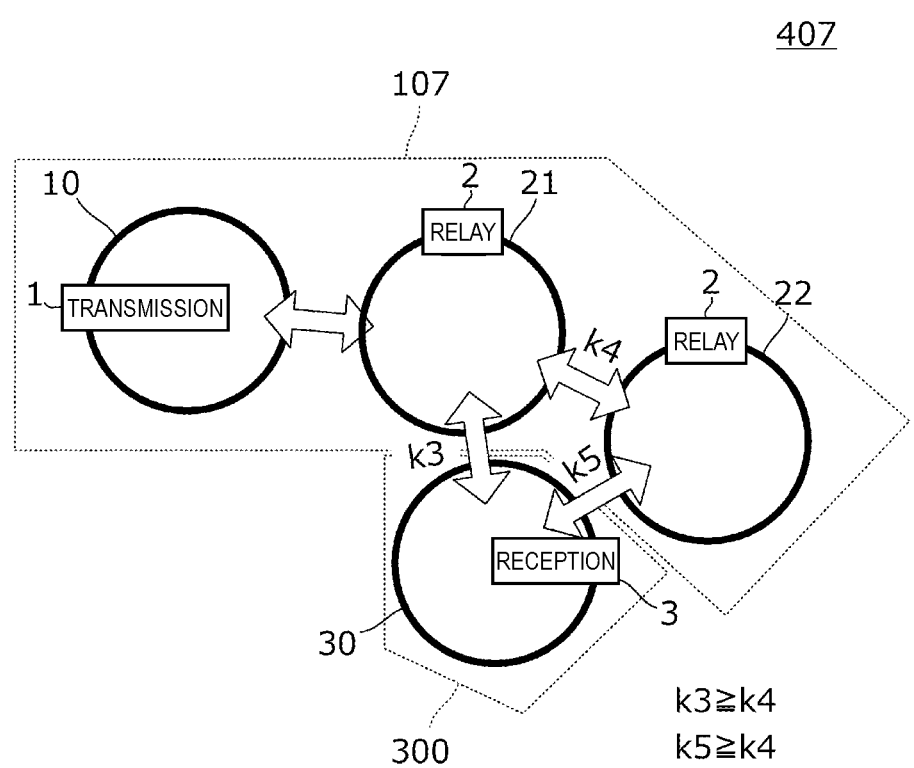
FIG. 10 is a diagram illustrating the configurations of a wireless power supply system and a power transmission device according to a seventh embodiment.

FIG. 10 is a diagram illustrating the configurations of a wireless power supply system 407 and a power transmission device according to the seventh embodiment. In the wireless power supply system 407, power is supplied from a power transmission device 107, which includes a power transmission coil 10, to a power reception device 300, which includes a power reception coil 30, using at least a magnetic resonance method.

As illustrated in FIG. 10, the wireless power supply system 407 includes the power transmission coil 10, the relay coils 21 and 22, and the power reception coil 30, which each have a circular loop shape. The relay coil 21 is arranged close to the power transmission coil 10 and the power reception coil 30. In addition, the relay coil 22 is arranged close to the power transmission coil 21 and the power reception coil 30.

A power transmission circuit 1 is connected to the power transmission coil 10 and a power reception circuit 3 is connected to the power reception coil 30. The power transmission coil 10 and the relay coil 21 are at least magnetically coupled with each other and the relay coil 22 is at least magnetically coupled with the relay coil 21. The power reception coil 30 is at least magnetically coupled with the relay coils 21 and 22.

In the example illustrated in FIG. 10, the wireless power supply system illustrated in FIG. 6 in the third embodiment and the wireless power supply system illustrated in FIG. 7 in the fourth embodiment are combined with each other.

The configurations of the power transmission circuit 1, the relay circuit 2, and the power reception circuit 3 are the same as those described in the first and second embodiments.

As illustrated in FIG. 10, when k3 represents the coupling coefficient between the relay coil 21 and the power reception coil 30, k5 represents the coupling coefficient between the relay coil 22 and the power reception coil 30, and k4 represents the coupling coefficient between the relay coil 21 and the relay coil 22, the relationships k3≥k4 and k5 k4 hold true. When d3 represents the shortest distance between the relay coil 21 and the power reception coil 30, d5 represents the shortest distance between the relay coil 22 and the power reception coil 30, and d4 represents the shortest distance between the relay coil 21 and the relay coil 22, the relationships d3≤d4 and d5≤d4 hold true.

According to this embodiment, power can be supplied from the power transmission device 107 to the power reception device 300 via the same operational effects as in the wireless power supply system according to the third embodiment and the wireless power supply system according to the fourth embodiment.

Eighth Embodiment

In an eighth embodiment, a wireless power supply system is described in which power is wirelessly supplied from a power transmission device to a power reception device using a relationship in which at least part of a coil opening overlaps a power transmission coil or a relay coil in plan view, and a power transmission device of the wireless power supply system is described.

Figure 11:
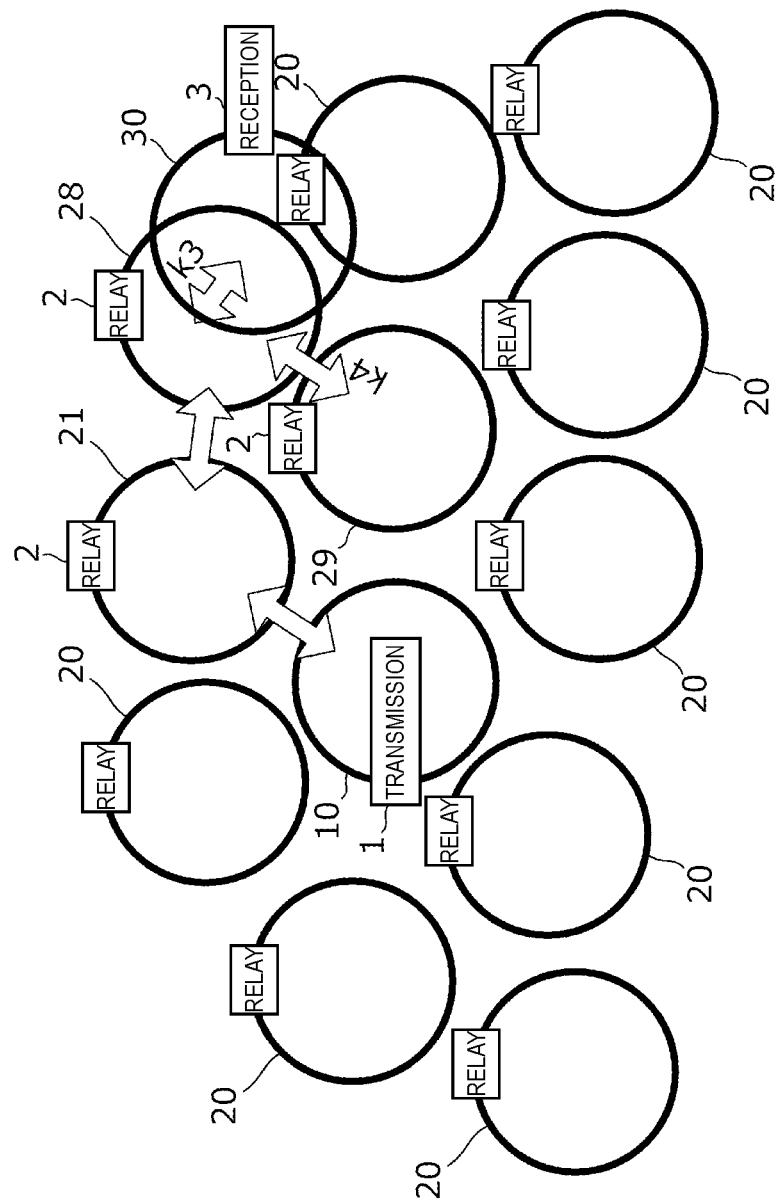
FIG. 11 is a diagram illustrating the configurations of a wireless power supply system and a power transmission device according to an eighth embodiment.

FIG. 11 is a diagram illustrating the configurations of a wireless power supply system 408 and a power transmission device according to the eighth embodiment. In the wireless power supply system 408, power is supplied from a power transmission device, which includes a power transmission coil 10, to a power reception device, which includes a power reception coil 30 that is at least magnetically coupled thereto via a plurality of relay coils 21 and 28 using at least a magnetic resonance method. In FIG. 11, an example is illustrated in which a large number of relay coils 20 are arranged in the region surrounding the power transmission coil. In addition, an example is illustrated of a system in which power is wirelessly supplied from the power transmission device to the power reception device using a plurality of relay coils and in which there is a relay coil downstream of a relay coil (coupling relay coil) that is coupled with the power reception coil among the plurality of relay coils.

As illustrated in FIG. 11, the wireless power supply system 408 includes the power transmission coil 10, a plurality of relay coils (20, 21, 28, etc.), and the power reception coil 30, which each have a circular loop shape. The power reception coil 30 is arranged close to the relay coil 28. The relay coil 29 is arranged close to the relay coil 28.

The relay coil 28 in this embodiment is an example of a "coupling relay coil" in the present disclosure. In addition, the relay coil 29 is a relay coil that is downstream of the "coupling relay coil".

The configurations of the power transmission circuit 1, the relay circuit 2, and the power reception circuit 3 are the same as those described in the first and second embodiments.

As illustrated in FIG. 11, when k3 represents the coupling coefficient between the coupling relay coil 28 and the power reception coil 30 and k4 represents the coupling coefficient between the coupling relay coil 28 and the relay coil 29, the relationship k3 k4 holds true.

As illustrated in this embodiment, even in the case of a relationship where the coil openings of the relay coil 28 and the power reception coil 30 at least partially overlap each other in plan view, supplying of power from the coupling relay coil 28 to the relay coil 29 downstream of the coupling relay coil 28 is suppressed and the power reception device can efficiently receive power from the coupling relay coil 28.

In addition, even in the case of a relationship where the coil openings of the power transmission coil 10 and the power reception coil 30 partially overlap each other in plan view, similarly to as in the case of the first embodiment, supplying of power from the power transmission coil 10 to the relay coils (20 and so on) is suppressed and the power reception device can efficiently receive power from the power transmission device.

Ninth Embodiment

In a ninth embodiment, a wireless power supply system is described in which power is wirelessly supplied from a power transmission device to a power reception device using a relationship in which at least part of a coil opening overlaps a plurality of relay coils in plan view, and a power transmission device of the wireless power supply system is described.

Figure 12:
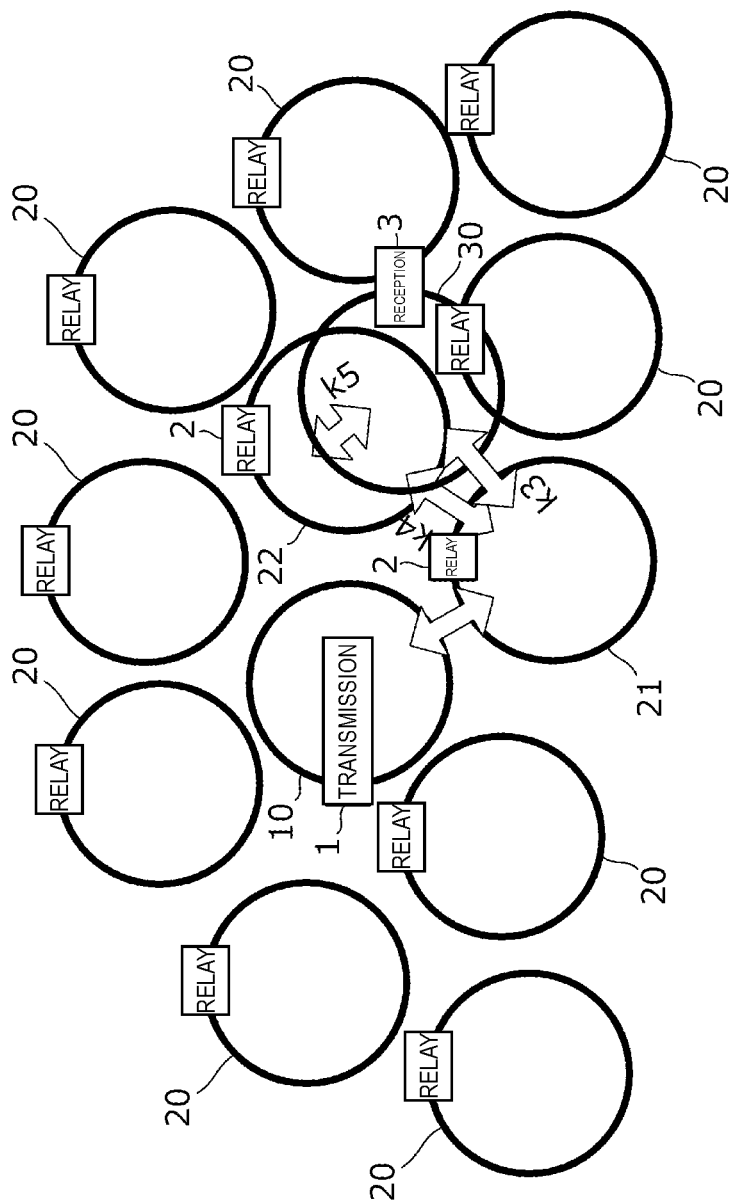
FIG. 12 is a diagram illustrating the configurations of a wireless power supply system and a power transmission device according to a ninth embodiment.

FIG. 12 is a diagram illustrating the configurations of a wireless power supply system 409 and a power transmission device according to the ninth embodiment. In the wireless power supply system 409, power is supplied from a power transmission device, which includes a power transmission coil 10, to a power reception device, which includes a power reception coil 30, using at least a magnetic resonance method.

As illustrated in FIG. 12, the wireless power supply system 409 includes the power transmission coil 10, a plurality of relay coils (20, 21, 22, etc.), and the power reception coil 30, which each have a circular loop shape. The power reception coil 30 is arranged close to the relay coils 21 and 22. The relay coil 21 and the relay coil 22 are arranged close to each other.

As illustrated in FIG. 12, when k3 represents the coupling coefficient between the relay coil 21 and the power reception coil 30, k5 represents the coupling coefficient between the relay coil 22 and the power reception coil 30, and k4 represents the coupling coefficient between the relay coil 21 and the relay coil 22, the relationships k3≥k4 and k5 k4 hold true.

As illustrated in this embodiment, even in the case of a relationship were the coil openings of the relay coil 22 and the power reception coil 30 at least partially overlap each other in plan view, similarly to as in the case of the seventh embodiment, power is supplied with high efficiency from the power transmission device, which includes the power transmission coil 10, to the power reception device, which includes the power reception coil 30.

Tenth Embodiment

In a tenth embodiment, an example of a wireless power supply system is described in which a power reception device is placed on a power transmission device, which includes a power transmission coil and a plurality of relay coils, and power is wirelessly supplied from the power transmission device to the power reception device.

Figure 13:
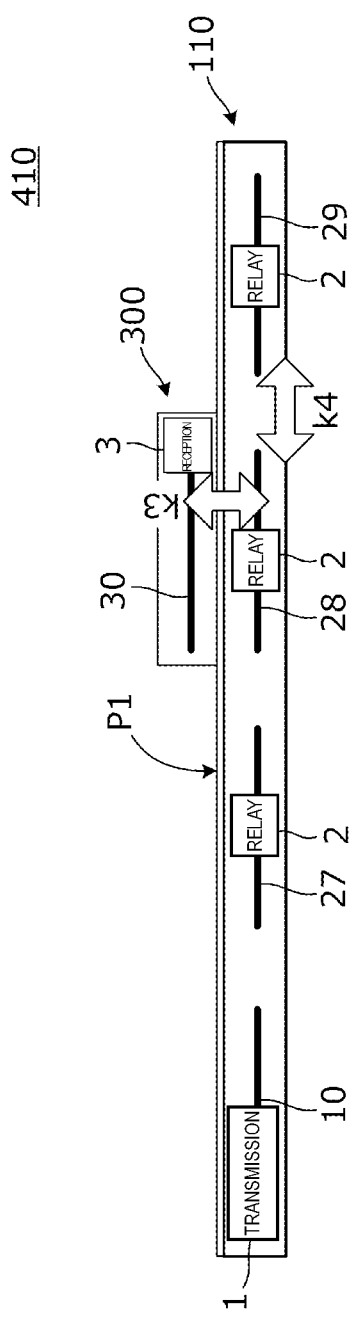
FIG. 13 is a schematic front view of a wireless power supply system according to a tenth embodiment.

FIG. 13 is a schematic front view of a wireless power supply system 410 according to the tenth embodiment. In FIG. 13, the internal configurations of a power transmission device 110 and a power reception device 300 are illustrated.

As illustrated in FIG. 13, the wireless power supply system 410 includes the power transmission device 110 and the power reception device 300. The power transmission device 110 includes a power transmission coil 10 and relay coils 27, 28, and 29, which each have a circular loop shape, and a casing that houses the coils. The power reception device 300 includes a circular-loop-shaped power reception coil 30 and a casing that houses the power reception coil 30. The relay coil 27 is magnetically coupled with the power transmission coil 10, the relay coil 28 is magnetically coupled with the relay coil 27, and the relay coil 29 is magnetically coupled with the relay coil 28.

The power reception device 300 includes the power reception coil 30 and a power reception circuit 3. The power reception coil 30 is magnetically coupled with any one out of the power transmission coil 10 and the relay coils 27, 28, and 29.

A first arrangement part P1, on which the power reception device 300 is to be placed, is provided above the power transmission coil 10 and the relay coils 27, 28, and 29 of the power transmission device 110. The power reception coil 30 is magnetically coupled with any one out of the power transmission coil 10 and the relay coils 27, 28, and 29 or with a plurality of the coils depending on the position at which the power reception device 300 is placed on the first arrangement part P1.

Eleventh Embodiment

In an eleventh embodiment, an example of a wireless power supply system is described that includes a power transmission device that has an arrangement part for a power reception device and an arrangement part for a relay coil.

FIG. 14 is a schematic front view of a wireless power supply system 411 according to the eleventh embodiment. In FIG. 14, the internal configurations of a power transmission device 111, a relay device 201, and a power reception device 300 are illustrated.

As illustrated in FIG. 14, the wireless power supply system 411 includes a first casing H1 and the power transmission device 111, which is inside the first casing H1, the relay device 201, and the power reception device 300. The power transmission device 111 includes a power transmission coil 10 and relay coils 27 and 28, which each have a circular loop shape. The relay device 201 includes a second casing H2 and a relay coil 29 and a relay circuit 2, which are inside the second casing H2. The power reception device 300 includes a power reception coil 30 and a power reception circuit 3. The relay coil 27 is magnetically coupled with the power transmission coil 10 and the relay coil 28 is magnetically coupled with the relay coil 27.

A first arrangement part P1, on which the power reception device 300 is to be placed, is provided above the relay coil 28 of the power transmission device 111. When the power reception device 300 is placed on the first arrangement part P1, the power reception coil 30 is magnetically coupled with the relay coil 28.

In addition, a second arrangement part P2 is provided at the side of the relay coil 28 of the power transmission device 111. The relay device or the power reception device is to be arranged parallel to the second arrangement part P2. In the example illustrated in FIG. 14, the relay device 201 is arranged parallel to the second arrangement part P2. A third arrangement part P3, on which the power reception device is to be placed, is provided on an upper surface of the relay device 201. When the power reception device 300 is placed on the third arrangement part P3, the power reception coil 30 of the power reception device 300 is magnetically coupled with the relay coil 29.

Similarly, if an arrangement part, with respect to which a relay device or a power reception device is to be arranged in a parallel manner, is provided at a side part of the relay device 201, power could be supplied to that device by arranging the relay device or power reception device parallel to that arrangement part.

In the above-described embodiments, examples have been described in which the power transmission coil 10, the relay coils (20-29 etc.), and the power reception coil 30 all have the same diameter and have winding axes that coincide with each other or are parallel to each other, but the power transmission coil 10, the relay coils (20-29 etc.), and the power reception coil 30 are not limited to having these relationships. The present disclosure can be similarly further applied in a case where coils that close to each other are not parallel to each other, in a case where the coils have different diameters, and in a case where the coils have different winding axes, and furthermore the present disclosure can be similarly applied in a case where the winding axes have a "twisted positional" relationship with respect to each other.

Furthermore, each of the planes of the coil openings of the power transmission coil 10, the relay coils (20-29 etc.), and the power reception coil 30 is not limited to being flat and may instead form a curved surface. For example, a coil conductor pattern may be formed on a flexible substrate or a sheet-like coil may be arranged along a curved surface.

The same operational effects are realized for cases where members close to the power transmission coil, the power transmission coil, the relay coils, the power reception coil, and members close to the power reception coil have any of the sizes or shapes described above by satisfying the above conditions for "shortest distance" where two members that define a distance therebetween are divided into minute sections and the "shortest distance" is defined as the shortest distance among distances between the individual minute sections.

Finally, the descriptions of the above embodiments are illustrative in all points and are not restrictive. A person skilled in the art can make modifications and changes as appropriate. The scope of the present disclosure is defined by the following claims rather than by the above-described embodiments. In addition, changes from the embodiments that are within the scope of equivalents to the scope of the claims are included in the scope of the present disclosure.

What is claimed is:

1. A wireless power supply system employing a magnetic resonance technique in which high-frequency power is wirelessly supplied from a power transmission device that includes a power transmission coil, resonant capacitor $C_r$, switch elements and switching control circuit and is electrically connected to DC power supply to a power reception device that includes a power reception coil that is at least magnetically coupled with the power transmission coil, wherein the transmission coil and the resonance capacitor form a power-transmission-side resonant circuit, and the switching control circuit intermittently applies a DC power supply to the power-transmission-side resonant circuit by turning the switch element on and off at a prescribed switching frequency to generate resonance current in the power-side resonant circuit, the wireless power supply system comprising:

a relay coil that is coupled with the power transmission coil and the power reception coil using at least a magnetic field; and a relay circuit that is connected to the relay coil and forms a resonant circuit together with the relay coil; wherein when $k1$ represents a coupling coefficient between the power transmission coil and the power reception coil and $k2$ represents a coupling coefficient between the power transmission coil and the relay coil, a relationship $k1 > k2$ holds true, the relay coil is provided at a position that is between the power transmission coil and the power reception coil and that is a position other than along a shortest distance between the power transmission coil and the power reception coil, when $k3$ represents a coupling coefficient between the power reception coil and the relay coil, a relationship $k3 > k2$ holds true, and the maximum efficiencies is when $k3 > k2$.

2. The wireless power supply system according to claim 1, wherein the relay coil comprises a plurality of relay coils, the relay circuit comprises a plurality of relay circuits that are respectively connected to the plurality of relay coils and respectively form resonant circuits together with the relay coils, among the plurality of relay coils, adjacent relay coils are coupled with each other using at least a magnetic field, one relay coil among the plurality of relay coils is coupled with the power transmission coil using at least a magnetic field, and one relay coil among the plurality of relay coils is a coupling relay coil that is coupled with the power reception coil using at least a magnetic field, and when k4 represents a coupling coefficient between a relay coil that is downstream of the coupling relay coil, among the plurality of relay coils, and the coupling relay coil, a relationship k3>k4 holds true, and the plurality of relay coils include at least one relay coil that is provided at a position between the power transmission coil and the power reception coil and that is a position other than along a shortest distance between the power transmission coil and the power reception coil.

3. The power transmission device of the wireless power supply system according to claim 2, further comprising:
a power transmission circuit that is connected to the power transmission coil and supplies high-frequency power to the power transmission coil; and
a casing that houses the power transmission coil and the relay coil and has an arrangement part on which the power reception coil that is coupled with the power transmission coil using at least a magnetic field is to be arranged.

4. The wireless power supply system employing the magnetic resonance technique according to claim 2, further comprising:
a first casing that houses the power transmission coil and the plurality of relay coils; and
a second casing, that is different from the first casing and houses the reception coil.

5. The wireless power supply system according to claim 2, wherein among the plurality of relay coils, adjacent relay coils are coupled with each other using at least a magnetic field, one relay coil among the plurality of relay coils is coupled with the power transmission coil using at least a magnetic field, and one relay coil among the plurality of relay coils is a coupling relay coil that is coupled with the power reception coil using at least a magnetic field, and
when k5 represents a coupling coefficient between the coupling relay coil and the power reception coil, a relations k5≥k4 holds true.

6. The power transmission device of the wireless power supply system according to claim 5, further comprising:
a power transmission circuit that is connected to the power transmission coil and supplies high-frequency power to the power transmission coil; and
a casing that houses the power transmission coil and the relay coil and has an arrangement part on which the power reception coil that is coupled with the power transmission coil using at least a magnetic field is to be arranged.

7. The wireless power supply system employing the magnetic resonance technique according to claim 5, further comprising:
a first casing that houses the power transmission coil and the plurality of relay coils; and
a second casing, that is different from the first casing and houses the reception coil.

8. The power transmission device of the wireless power supply system according to claim 1, further comprising:
a power transmission circuit that is connected to the power transmission coil and supplies high-frequency power to the power transmission coil; and
a casing that houses the power transmission coil and the relay coil and has an arrangement part on which the power reception coil that is coupled with the power transmission coil using at least a magnetic field is to be arranged.

9. The power transmission device of the wireless power supply system according to claim 8, wherein the casing is formed of a first casing that houses the power transmission coil and a second casing that houses the relay coil, and the second casing is configured so as to be separable from the first casing.

10. The power transmission device of the wireless power supply system according to claim 9, wherein the first casing includes an arrangement part configured such that the relay coil or the power reception coil is arranged at such a position with respect to the power transmission coil that coil openings thereof overlap in plan view.

11. The power transmission device of the wireless power supply system according to claim 9, wherein the first casing includes an arrangement part configured such that the relay coil or the power reception coil is arranged parallel to the power transmission coil.

12. The power transmission device of the wireless power supply system according to claim 9, wherein the second casing includes an arrangement part arranged at a position such that a coil opening of the relay coil overlaps a coil opening of the power transmission coil or the power reception coil in plan view.

13. The power transmission device of the wireless power supply system according to claim 9, wherein the second casing includes an arrangement part configured such that the power transmission coil or the power reception coil is arranged parallel to the relay coil.

14. The power transmission device of the wireless power supply system according to claim 1, further comprising:
a power transmission circuit that is connected to the power transmission coil and supplies high-frequency power to the power transmission coil; and
a casing that houses the power transmission coil and the relay coil and has an arrangement part on which the power reception coil that is coupled with the power transmission coil using at least a magnetic field is to be arranged.

15. The wireless power supply system employing the magnetic resonance technique according to claim 1, further comprising:
a first casing that houses the power transmission coil and the relay coil; and
a second casing, that is different from the first casing and houses the reception coil.

16. The wireless power supply system employing the magnetic resonance technique according to claim 1, further comprising:
a first casing that houses the power transmission coil and the relay coil; and
a second casing, that is different from the first casing and houses the reception coil.

17. A wireless power supply system employing a magnetic resonance technique in which high-frequency power is wirelessly supplied from a power transmission device that includes a power transmission coil, resonant capacitor Cr, switch elements and switching control circuit and is electrically connected to DC power supply to a power reception device that includes a power reception coil that is at least magnetically coupled with the power transmission coil, wherein
the transmission coil and the resonance capacitor form a power-transmission-side resonant circuit, and
the switching control circuit intermittently applies a DC power supply to the power-transmission-side resonant circuit by turning the switch element on and off at a prescribed switching frequency to generate resonance current in the power-side resonant circuit,
the wireless power supply system comprising:

a relay coil that is coupled with the power transmission coil and the power reception coil using at least a magnetic field; and a relay circuit that is connected to the relay coil and forms a resonant circuit together with the relay coil; wherein the power transmission coil and the relay coil are housed in a first casing, the reception coil is housed in a second casing that is different from the first casing, when d1 represents a shortest distance between the power transmission coil and the power reception coil and d2 represents a shortest distance between the power transmission coil and the relay coil, a relationship $d1 \leq d2$ holds true, the relay coil is provided at a position that is between the power transmission coil and the power reception coil and that is a position other than along a shortest distance between the power transmission coil and the power reception coil, when k2 represents a coupling coefficient between the power transmission coil and the relay coil, and k3 represents a coupling coefficient between the power reception coil and the relay coil, a relationship $k3 > k2$ holds true, and the maximum efficiencies is when $k3 > k2$.

18. The power transmission device of the wireless power supply system according to claim 17, further comprising:
a power transmission circuit that is connected to the power transmission coil and supplies high-frequency power to the power transmission coil; and
the power reception coil, that is coupled with the power transmission coil using at least a magnetic field, is arranged on the first casing.

19. The wireless power supply system according to claim 5, wherein when d3 represents a shortest distance between the power reception coil and the relay coil, a relationship $d3 \geq d2$ holds true.

20. The power transmission device of the wireless power supply system according to claim 19, further comprising:
a power transmission circuit that is connected to the power transmission coil and supplies high-frequency power to the power transmission coil; and
the power reception coil, that is coupled with the power transmission coil using at least a magnetic field, is arranged on the first casing.

21. The wireless power supply system according to claim 19, wherein
the relay coil comprises a plurality of relay coils; and
the relay circuit comprises a plurality of relay circuits that are respectively connected to the plurality of relay coils and respectively form resonant circuits together with the relay coils; wherein
among the plurality of relay coils, adjacent relay coils are coupled with each other using at least a magnetic field, one relay coil among the plurality of relay coils is coupled with the power transmission coil using at least a magnetic field, and one relay coil among the plurality of relay coils is a coupling relay coil that is coupled with the power reception coil using at least a magnetic field,
when d4 represents a shortest distance between a relay coil that is downstream of the coupling relay coil, among the plurality of relay coils, and the coupling relay coil, a relationship $d3 \geq d4$ holds true, and
the plurality of relay coils include at least one relay coil that is provided at a position between the power transmission coil and the power reception coil and that is a position other than along a shortest distance between the power transmission coil and the power reception coil.

22. The wireless power supply system according to claim 21, wherein
when d5 represents a shortest distance between the coupling relay coil and the power reception coil, a relationship $d5 \geq d4$ holds true.

23. The power transmission device of the wireless power supply system according to claim 21, further comprising:
a power transmission circuit that is connected to the power transmission coil and supplies high-frequency power to the power transmission coil; and
the power reception coil, that is coupled with the power transmission coil using at least a magnetic field, is arranged on the first casing.

* * * * *